US008825061B1

(12) United States Patent
Tran et al.

(10) Patent No.: US 8,825,061 B1
(45) Date of Patent: Sep. 2, 2014

(54) SYSTEM AND METHOD FOR WIRELESS NETWORK PLANNING

(75) Inventors: Thuy Thomas Tran, Fairfax, VA (US); Janet Young, Woodbridge, VA (US); Zaroking Carvajal Castro, Herndon, VA (US)

(73) Assignee: Nextel Communications, Inc., Reston, VA (US)

( * ) Notice: Subject to any disclaimer, the term of this patent is extended or adjusted under 35 U.S.C. 154(b) by 985 days.

(21) Appl. No.: 11/385,723

(22) Filed: Mar. 22, 2006

Related U.S. Application Data (60) Provisional application No. 60/663,879, filed on Mar. 22, 2005.

(51) Int. Cl.
| | |
|---|---|
| *H04W 40/00* | (2009.01) |
| *H04W 24/08* | (2009.01) |
| *H04W 4/26* | (2009.01) |
| *H04M 15/00* | (2006.01) |
| *H04M 17/00* | (2006.01) |
| *H04M 3/42* | (2006.01) |

(52) U.S. Cl.
CPC .............. *H04W 24/08* (2013.01); *H04M 15/58* (2013.01); *H04M 17/00* (2013.01); *H04M 15/853* (2013.01); *H04W 4/26* (2013.01); *H04M 3/42* (2013.01)

USPC ........ 455/446; 455/422.1; 455/450; 455/451; 455/452.2; 370/252; 370/332

(58) Field of Classification Search
CPC ..... H04M 3/42; H04M 15/58; H04M 15/853; H04M 17/00; H04W 24/08; H04W 4/26
USPC ........ 455/414.1, 423, 446, 422.1, 450–452.2; 370/329, 252, 332
See application file for complete search history.

(56) References Cited

U.S. PATENT DOCUMENTS

| | | | | |
|---|---|---|---|---|
| 6,336,035 | B1 * | 1/2002 | Somoza et al. ............... | 455/446 |
| 6,501,737 | B1 * | 12/2002 | Mathal et al. ................. | 370/252 |
| 7,058,035 | B2 * | 6/2006 | English ......................... | 370/332 |
| 7,301,902 | B2 * | 11/2007 | Rambo et al. ................. | 370/230 |
| 2005/0097161 | A1 * | 5/2005 | Chiou et al. .................. | 709/200 |
| 2005/0159165 | A1 * | 7/2005 | Argyropoulos et al. ... | 455/452.2 |
| 2006/0008064 | A1 * | 1/2006 | Sangillo ..................... | 379/114.08 |

* cited by examiner

*Primary Examiner* — Charles Appiah
*Assistant Examiner* — Jaime Holliday (57) ABSTRACT

Systems and methods for wireless network planning are provided. The wireless network capacity forecast can account for different usage patterns of different types of wireless communication services and/or of prepaid and postpaid mobile stations. The wireless network capacity forecast can also account for an ability of different mobile stations with different capabilities to operate in different frequency bands. The wireless network capacity forecast can identify base sites that should be split into two or more base sites.

15 Claims, 3 Drawing Sheets

SYSTEM AND METHOD FOR WIRELESS NETWORK PLANNING

The present application claims priority under 35 U.S.C. §119 to U.S. Provisional Application No. 60/663,879, filed Mar. 22, 2005, the entire disclosure of which is herein expressly incorporated by reference.

BACKGROUND OF THE INVENTION

Increasing the capacity of wireless networks involves large capital outlays. Accordingly, wireless network operators employ network capacity design tools to estimate the number of base sites and base radios required to support customer demands for voice and data traffic.

One conventional capacity planning tool forecasts how many cell sites and base radios are required for a single market. This tool includes great detail on computation of control channel usage, reserved time slots and other network features. This capacity planning tool took longer than an hour to forecast one market for only one year. Although this tool is useful for predicting the location and timing for new base radios installations, it cannot handle the volume of computations needed to forecast nationwide results in a reasonable amount of time.

SUMMARY OF THE INVENTION

Wireless network operators need to be able to quickly and accurately predict how many cell sites and base radios are required in a nationwide network to meet the demands of both voice and data traffic under different business case scenarios. Some networks support interconnect voice, dispatch voice and packet data communications, which further complicates capacity planning. Interconnect voice communication services are those typically provided by most cellular carriers as circuit-switched communications. Dispatch communication services are commonly known as a "walkie-talkie" type of call, such as provided by Sprint Nextel Corporation and identified by the trade name Direct Connect. In networks that support interconnect voice, dispatch voice and packet data there are different usage patterns for these different types of services. Moreover, in some networks traffic channel usage of these services is different. For example, in the iDEN network interconnect voice uses a voice coder (vocoder) that requires more traffic channels than required by the vocoders employed for dispatch voice. Additionally, in some networks different mobile stations may have vocoders that are more efficient in the use of traffic channels for a particular service than other mobile stations. Moreover, in some networks high throughput packet data services are provided by combining a number of different voice channels. The present invention provides systems and methods for capacity planning that account for the different types of services, the different usage patterns of the services and the different traffic channel requirements of the services.

Another issue that complicates capacity planning is the allocation of frequency spectrum by government bodies. Some networks employ different frequencies in the same or different parts of the network. Additionally, not all mobile stations may have the ability to communicate using all of the allocated frequencies. Accordingly, the capacity planning tool of the present invention can account for the capabilities of different mobile stations to use different frequencies.

A further issue complicating capacity planning is that some networks support both prepaid and postpaid mobile stations. These different types of mobile stations may have different usage patterns. Accordingly, the capacity planning tool of the present invention can account for the different usage patterns of prepaid and postpaid mobile stations.

The capacity planning tool of the present invention provides a long range (ten year) forecast for a complete national network in one iteration. The capacity planning tool of the present invention can employ various forecasts for subscribers, traffic patterns, spectrum allocations and the effect of various technological features that affect capacity. The capacity planning tool of the present invention then computes the traffic demand for each cell site in the network for each time period, and determines the number of base radios required to handle the computed traffic demand. If the number of base radios reaches a certain breakpoint, the capacity planning tool of the present invention will report that a new site should be built to offload the existing one. These outputs, site builds and radio counts, can then be converted into capital outlays and expenses. Oftentimes, several different sets of inputs are needed in order to fully understand the bounds of the problem. To support this need, the present invention performs its calculations quickly to provide an acceptable turnaround time for the analyses.

One novel feature of the present invention is the ability to produce a per site traffic forecast. Specifically, two current traffic distributions per market (one for postpaid and one for prepaid) are calculated per site by dividing each site's average bouncing busy hour postpaid traffic over one week by the total average bouncing busy hour postpaid traffic in the market during that same week, and by dividing each site's average bouncing hour prepaid dispatch communication minutes of use (MOUs) over one month by the total average bouncing busy hour prepaid dispatch communication MOUs in the market during that same month. These provide the percentages of postpaid and prepaid traffic currently carried by each site in the market. These distribution percentages for each site are then multiplied by the total Market postpaid and prepaid Traffic Forecasts and then added to provide the total Per Site Traffic Forecast for each time period in the analysis. By tracking traffic per geographic location instead of per antenna, the calculation time can be significantly reduced.

The capacity planning tool of the present invention employs an algorithm for determining the number of simultaneous voice channels available on a site. Wireless networks can handle voice, data and dispatch traffic. Each type of traffic can require different resource levels under certain conditions. The calculation of simultaneous voice channels per base radio provides a way to combine this traffic. A derating factor can be added to account for control channel overhead. The derating factor can be determined using empirical studies of wireless network traffic usage.

While conventional capacity planning tools calculate the average usage for the average user, the capacity planning tool of the present invention accommodates two subscriber classes, prepaid and postpaid. However, it has been determined that prepaid and postpaid subscribers have different calling patterns. The capacity planning tool of the present invention handles postpaid and prepaid subscribers separately and combine the effects generated at the latest possible point in the calculations.

The present invention also provides forecasts of packet data usage, wideband packet data usage (i.e., the use of multiple channels to provide packet data services), and busy hour % forecast, combined with the average throughput per base radio to calculate the equivalent Erlangs of data usage per subscriber during the busy hour. Packet data MOUs are calculated by converting monthly data usage per subscriber to equivalent data. An average throughput per base radio can be estimated as 17 kbps for packet data. However, the present invention can employ other average throughput values. The % busy hour can be a forecasted value based on past network data. It is calculated by dividing nationwide bouncing busy hour (BBH) voice Erlangs for five consecutive weekdays by the total traffic generated during those five weekdays. To provide a conservative estimate, the capacity planning tool of the present invention assumes that all MOUs are generated during weekdays. Thus, weekend traffic is ignored so that the number of busy days per month is equal to the number of weekdays in a month. For a typical month, this is about 21 days. Considering weekend traffic would increase this number to 25 or 26, but the capacity planning tool of the present invention takes a more conservative approach Most scenarios assume a fixed grade of service (GoS) where all sites in the network are required to meet the same level of performance for call blocking. In addition to a standard GoS calculation, the capacity planning tool of the present invention provides a variable GoS algorithm to allow higher blocking on sites with lower radio stack sizes.

Some wireless networks utilize different frequency bands, with some handsets capable of operating over only one of the frequency bands while other handsets are capable of operating over all of the different frequency bands. For example, a wireless network can operate using channels in the 800 and 900 MHz range, with some handsets capable of using channels from both frequency ranges, and some handsets being capable of operating over only the 800 MHz frequency range. Accordingly, in such wireless networks, 900 MHz radios require special treatment because the utilization of 900 MHz radios is affected by the number of subscribers who have handsets capable of operating at 900 MHz, whereas the use of 800 MHz radios is only limited by the amount of 800 MHz spectrum that is available. To account for this fact, the present invention can determine an effective "utilization rate" based on the percentage of subscribers that have 900 MHz capable handsets and the percentage of total available spectrum that is at 900 MHz. Utilization can be defined as the percentage of available capacity that is occupied by available traffic. The percentage of traffic offered at 900 MHz can be assumed to be equal to the 900 MHz handset penetration rate, because 900 MHz-capable handsets will always attempt to use a 900 MHz channel before using an 800 MHz channel. In addition, this inherently assumes that subscribers with 900 MHz-capable handsets have the same average usage per subscriber as subscribers with 800 MHz-only handsets. The available capacity provided by 900 MHz channels is determined by the spectrum allocations in each market.

The present invention can use max base radios per sector values and convert them to max base radios per site. Multiplying the max base radios per sector by 3 sectors per site would give a max base radios per site which is based on an assumption that traffic is evenly distributed around a site. This may result in an under-prediction of the number of sites required to serve the traffic in a real world scenario. Therefore, this factor should be derated to account for actual traffic distribution and real world constraints. Accordingly, based on a analysis, it was realized that the average traffic around a site was split roughly 48%/30%/22%. This results in a derating factor equal to 30.55%. However, applying this derate factor would result in the assumption that sites are split immediately when one sector exceeds the max base radio threshold (in case of fixed GoS approach). In some networks this may not hold true because some congestion relief features offload congested sectors by forcing subscribers near the cell boundary to handoff to the adjacent sectors/sites, and some wireless networks employ a policy to attempt to frequency plan sectors using an automated frequency planning tool, such as CellOpt, even when they exceed the Max base radio threshold. Additionally, wireless network operators may split a site only when absolutely necessary. Furthermore, in reality two adjacent sectors can be offloaded with one site rather than two. The above derate factor would produce one new site for each sector that exceeds the Max base radio threshold. Therefore, applying the derate factor above would have the effect of over-predicting the number of sites necessary to serve the traffic, and some reduction of the full derate factor is appropriate. Accordingly, it has been realized that a derate reduction of 50% is desirable, thus a total derate of 15% can be employed.

The capacity planning tool of the present invention incorporates a tool for determining the number of T1 or DS0s needed. Unlike the capacity planning tool of the present invention that makes all its calculation at base transceiver station (BTS) level to forecast splits, the tool for determining the number of T1 or DS0s needed makes all its calculation at site splits level. This means that if a network has 100 sites and the capacity planning tool of the present invention forecasts 150 sites for a particular period, the tool for determining the number of T1 or DS0s needed will calculate T1s for each 150 sites. The tool for determining the number of T1 or DS0s needed will create one row in its output sheet for each split and record the number of DS0 and T1 needed for each quarter. The present invention provides two different methods for determining the redistribution of traffic from the original site to the split site.

Other objects, advantages and novel features of the present invention will become apparent from the following detailed description of the invention when considered in conjunction with the accompanying drawings.
base radio

DETAILED DESCRIPTION OF THE PREFERRED EMBODIMENTS

The capacity planning tool of the present invention employs a per-site capacity model, i.e., it utilizes prepaid and postpaid traffic data per site to calculate capacity requirements for each site in a nationwide wireless network. The capacity planning tool of the present invention can employ actual site and prepaid and postpaid traffic data from an existing wireless network to determine the current prepaid and postpaid traffic distribution in the network, and then maintain this distribution uniformly into the future. Accordingly, traffic is forecasted for the coverage area of each site in the current network. Thus, an underlying assumption is that traffic distribution will not significantly change over the time of the analysis. However, if traffic distribution does change, the capacity planning tool can provide updated information based on the new traffic distribution.

In addition, the capacity planning tool of the present invention is a per market model with separate calculations for each different market. All sites in the network are assigned to a market and input data for each market is used to calculate the number of sites and base radios required per market. For example, inputs such as 800 MHz and 900 MHz channels, subscriber forecast, new 6:1 vocoder penetration, market reuse, etc. are input at the market level. This greatly increases the complexity of the inputs, but also increases the accuracy of the output. The present invention allows the selection of specific markets.

The minimum time period considered by the capacity planning tool of the present invention is one quarter of a year, however other minimum time periods can be employed. Thus, changes to input variables can be adjusted by quarter. Typically a ten-year analysis is done, so 40 time periods are considered in each analysis. Each input variable is represented by a 40×(# of markets) matrix of values. This creates enormous flexibility in the program, but also complicates data input.

Figure 1A:
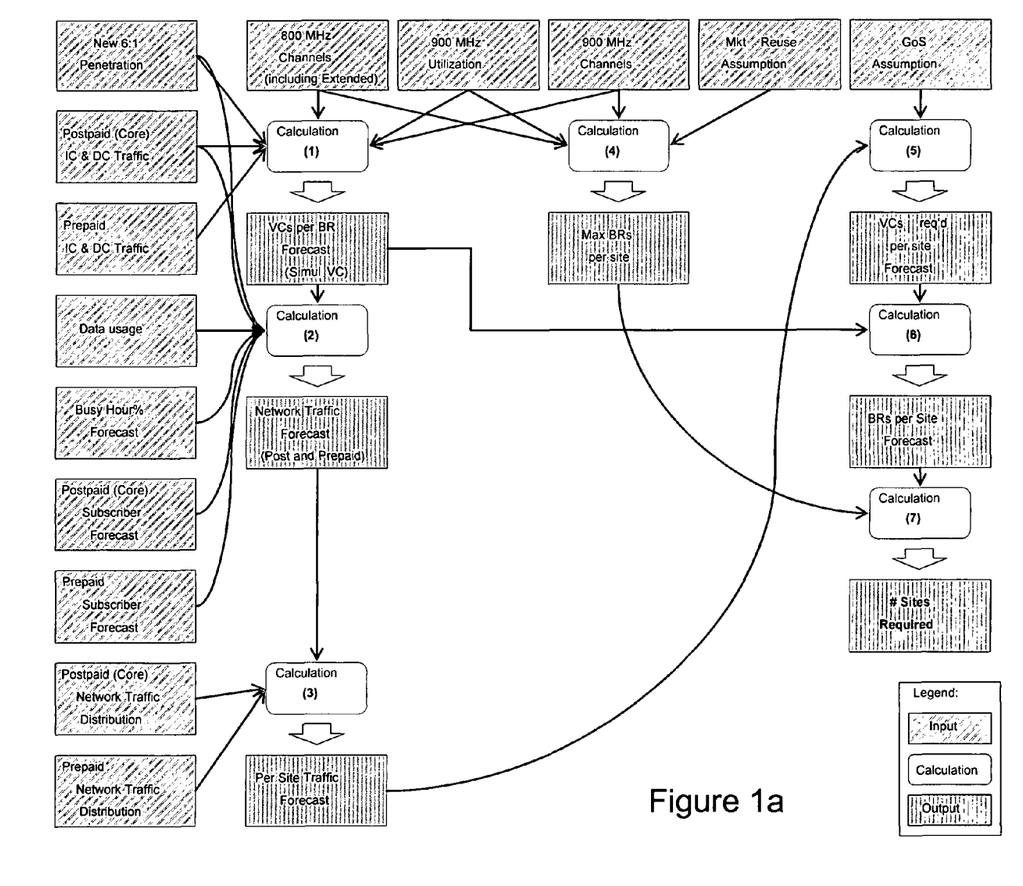
FIG. 1a illustrates an exemplary process flow using a fixed GoS approach in accordance with the present invention.
Figure 1B:
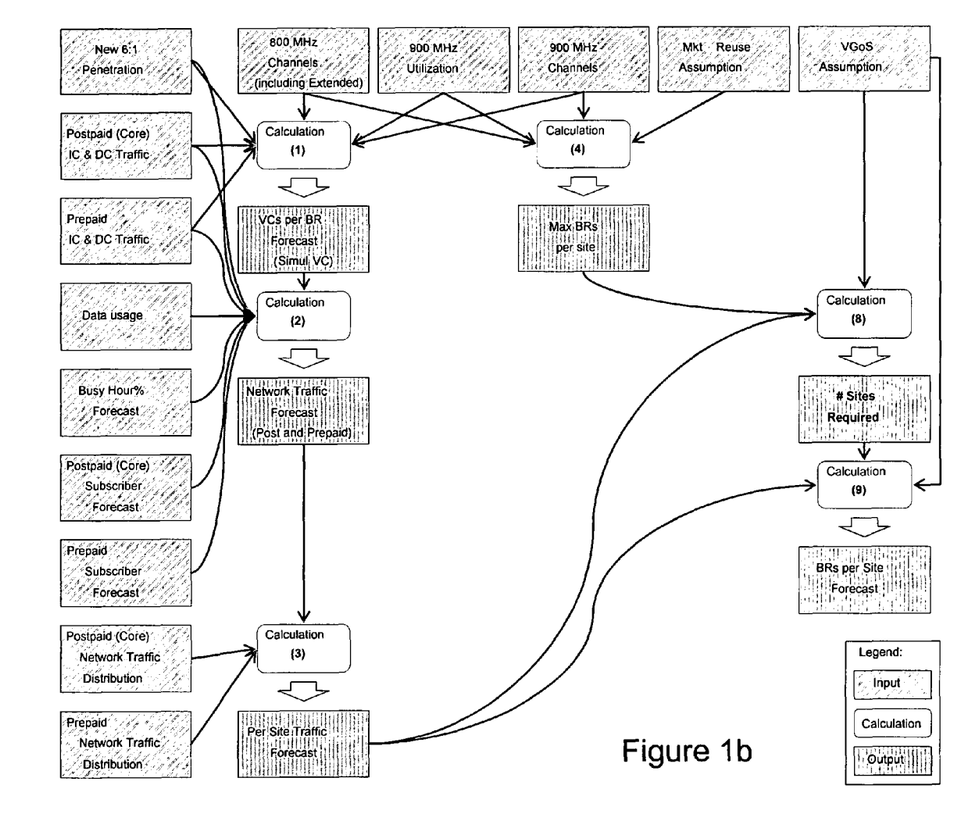
FIG. 1b illustrates an exemplary process flow using a variable GoS approach in accordance with the present invention.
Figure 2:
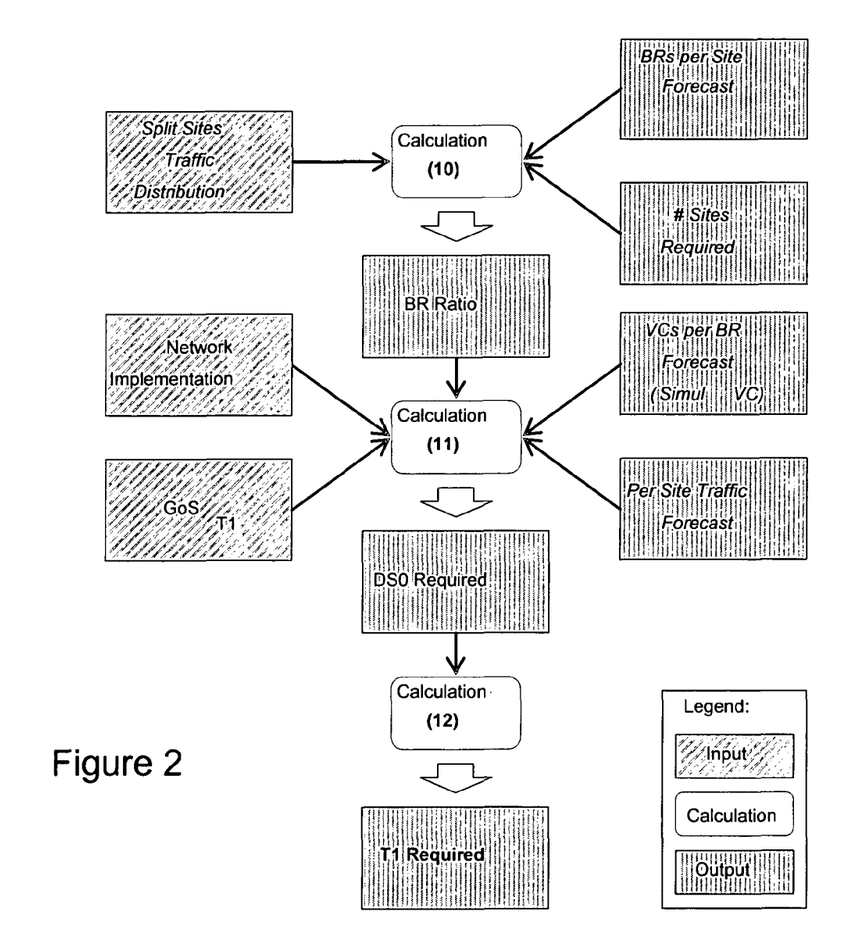
FIG. 2 illustrates an exemplary process flow for a tool for determining the number of T1s or DS0s needed in accordance with the present invention.

FIGS. 1a, 1b and 2 illustrate the process flow of the capacity planning tool of the present invention and tool for determining the number of T1 or DS0s needed of the present invention. The Figures are useful for understanding the inputs and outputs of the capacity planning tool of the present invention.

The tools provided by the present invention can calculate the number of sites and base radios using two different approaches: Fixed GoS and Variable GoS. FIG. 1a illustrates the process using Erlangs B traffic model to determine the need of base radios, and thus, sites. The latter approach uses Variable GoS criteria, which takes into consideration congestion relief, to allow higher blockage to smaller base radio stack than that of larger stacks. The following discussion addresses the individual calculations of the numbered blocks in the Figures.

The present invention includes a module to calculate the number of T1s needed for each site (herein referred to as the "T1 module"). Unlike the capacity planning tool of the present invention that makes all its calculation at BTS level to forecast splits, the T1 module makes all its calculation at site splits level. Accordingly, if a network has 100 sites and the capacity planning tool of the present invention forecasts 150 sites for a particular period, the T1 module will calculate T1s for each 150 sites. The T1 module will create one row in its output sheet for each split and record the number of DS0 and T1 needed for each quarter.

Calculation (1)—Simultaneous Voice Channels per Base Radio/Simultaneous Voice Channel The simultaneous voice channels (VCs) per base radio is an important concept that is employed in the capacity planning tool of the present invention's capacity model and drives the calculation of the number of required base radios. The basic concept of simultaneous voice channels (VCs) per base radio can be explained by the following two observations: if a base radio carries all 3:1 interconnect traffic then it will have 3 simultaneous VCs; and if a base radio carries all 6:1 dispatch communications and/or 6:1 interconnect then it will have 6 simultaneous VCs. However, the traffic at 800 MHz may be mixed, so actual simultaneous VCs on a given base radio at 800 MHz is somewhere between 3 and 6.

The basic formula to calculate this is:

$$\text{Voice Channels per } BR = \frac{6}{\underbrace{[2 \times \%IC \times (1 - \%New6{:}1)]}_{\text{Effect of 3:1 Interconnect}} + \underbrace{[\%IC \times \%New6{:}1]}_{\text{Effect of New 6:1 Interconnect}} + \underbrace{\%DC}_{\text{Effect of Dispatch}}}$$

where % IC+% DC=100% and % New6:1 is equal to the percentage of interconnect traffic generated by mobiles capable of 6:1 vocoding. % New 6:1 is the effective 6:1 traffic which depends on the number of handsets capable of 6:1 and the network's effective assignment rate of 6:1 vocoder. If there is no dispatch traffic and no New 6:1 mobiles in the traffic mix (% DC=0%, % IC=100%, and % New 6:1=0%), then the formula above reduces to 3 VCs per base radio, consistent with the first observation above. Likewise, if there is no interconnect traffic in the mix (% IC=0%, % DC=100%) and/or if all mobiles are capable of 6:1 interconnect (% New6: 1=100%) then the formula above reduces to 6 VCs per base radio, consistent with the second observation above.

This is the basic formula, but it does not address several issues. Therefore, three modifications can be made to this formula: 1) expand the formula to include the possibility of 12:1 dispatch; 2) add a derating factor to account for control channel overhead; and 3) add the effect of extended 800 MHz and 900 MHz channels that do not support dispatch services. A fourth modification may be added to account for inefficiencies of dynamic channel allocation (DCA). These modifications to the formula are discussed in detail below.

The capacity planning tool of the present invention accounts for the possibility of adding the effect of 12:1 dispatch, if necessary. The result is a simple modification to the basic formula in which the numerator and denominator are both multiplied by 2 and a factor to account for 12:1 dispatch traffic is added.

$$\text{Voice Channels per } BR = \frac{12}{\underbrace{[4 \times \%IC \times (1 - \%New6{:}1)]}_{\text{Effect of 3:1 Interconnect}} + \underbrace{[2 \times \%IC \times \%New6{:}1]}_{\text{Effect of New 6:1 Interconnect}} + \underbrace{[2 \times \%6{:}1DC]}_{\text{Effect of 6:1 Dispatch}} + \underbrace{\%12{:}1DC}_{\text{Effect of 12:1 Dispatch}}}$$

The formulas discussed above assume that % IC+% DC=100%. However, control channels use radio frequency (RF) resources so that the capacity available to carry voice calls is reduced. To account for this, the above formula is derated to account for control channels. The derating factor can account for dedicated control channel (DCCH), primary control channel (PCCH), and secondary control channel (SCCH) overheads. One estimation of DCCH overhead is that traffic on DCCHs accounts for 5.5% of traffic nationwide.

PCCH and SCCH overheads are more difficult to calculate because they depend on the size of the base radio stack in a sector. For example, in a sector with just two base radios, the overhead due to one 6:1 PCCH would be 1/12=8.33%. However, in a sector with nine base radios, PCCH overhead due to one 6:1 PCCH would be just 1/54=1.85%. With the addition of a tenth base radio, an SCCH may be necessary. Accordingly, a sector with 10 base radios would have overhead of 2/60=3.33%.

The current implementation of control channel overhead in the capacity planning tool of the present invention is based on an average per base radio, rather than an actual percentage that varies according to the number of base radios. This may affect the calculation of base radios because it will be under-predicting overhead for sectors with small base radio stacks and over-predicting for sectors with large base radio stacks. The non-linear nature of P/SCCH overheads exacerbates the inaccuracies. Accordingly, the capacity planning tool of the present invention can have these capabilities in this area modified.

Nevertheless, exemplary average overheads per base radio can be calculated using DCCH overhead of 5.5% plus P/SCCH overhead of 3.1% for a total overhead of 8.6%. The 3.1% overhead for P/SCCH was determined using two methods: 1) the average base radios per sector nationwide can be around 5.33, thus average PCCH overhead is 1/(5.33*6) =3.1%; and the average maximum base radio per sector is about 11 base radios, thus an SCCH is required, which represents the control channel overhead at the point at which most sectors are about to split; the point at which accurate base radio calculation is most critical. So the P/SCCH overhead for this case is 2/(11*6)=3.0%. Because these two methods produced approximately the same result, the more conservative value of 3.1% can be employed. Accordingly, the VCs per base radio formula is derated by 8.6% (i.e., it is multiplied by 91.4%) to account for total average control channel overhead.

If 900 MHz channels do not support dispatch services, the VCs per base radio formula for 900 MHz differs from the VCs per base radio formula for 800 MHz presented above. The formula for 900 MHz is:

$$\text{Voice Channels per } BR = \frac{6}{\underbrace{[2\times(1-\%New6{:}1)]}_{\text{Effect of 3:1 Interconnect}} + \underbrace{\%New6{:}1}_{\text{Effect of New 6:1 Interconnect}}}$$

Because base radios at 900 MHz have a different VCs per base radio calculation, and since the capacity planning tool of the present invention views all base radios equally, it is necessary to proportionally combine the VCs per base radio for 800 MHz base radios and 900 MHz base radios. This is done using the following formula:

$$\text{Simul VC per } BR_{800\&900MHz} =$$
$$VCs \text{ per } BR_{Basic\,800MHz} \times \frac{\text{Max } BRs_{800MHz} - \text{Max } BRs_{Extended\,800MHz}}{\text{Max } BRs_{800MHz} + \text{Max } BRs_{900MHz}} +$$
$$VCs \text{ per } BR_{Extended\,800\&90MHz} VCs/BR @ 900 \times$$
$$\frac{\text{Max } Util\,BRs_{900MHz} + \text{Max } BRs_{Extended\,800MHz}}{\text{Max } BRs_{800MHz} + \text{Max } BRs_{900MHz}}$$

In the formula above, VCs/base radio @ 800 is the VC formula that includes both interconnect and dispatch, and the VCs/base radio @ 900 is the VC formula that includes interconnect only. Both of these formulas include the derate factor for control channel overhead, since the overhead is estimated based on a per-base radio basis, rather than per sector or per site. The term MaxUtilbase radio@900 refers to the maximum base radios that can be utilized at 900 MHz due to the penetration of 900 MHz-capable phones.

Substituting the two equations into the formula above and adding the control channel derate will result in the formula found on the "Simul VCs" tab of the capacity planning tool of the present invention.

Calculation (2)—Network Traffic

The inputs of Erlangs per Sub values and subscriber forecast are used to calculate the total network traffic during the busy hour. In the capacity planning tool of the present invention, prepaid and postpaid traffic and subscriber forecasts are separated in order to account for call behavior differences. Prepaid subscribers may call more through dispatch communications than interconnect while postpaid subscribers may use more interconnect services than dispatch communications.

Network traffic calculation divides the traffic between voice and data. The following calculations are performed to determine the different components of interconnect and dispatch communications traffic:

Market Voice IC Traffic$_{Postpaid}$(Erlangs)=Forecast Subs$_{Postpaid}$×IC Erl/Sub$_{Postpaid}$ Market Voice dispatch communication Traffic$_{Postpaid}$ (Erlangs)=Forecast Subs$_{Postpaid}$×dispatch communication Erl/Sub$_{Postpaid}$ Market Voice Traffic$_{Postpaid}$(Erlangs)=Market Voice IC Traffic$_{Postpaid}$+Market Voice dispatch communication Traffic$_{Postpaid}$ Market Voice IC Traffic$_{Prepaid}$(Erlangs)=Forecast Subs$_{Prepaid}$×IC Erl/Sub$_{Prepaid}$ Market Voice dispatch communication Traffic$_{Prepaid}$ (Erlangs)=Forecast Subs$_{Prepaid}$×dispatch communication Erl/Sub$_{Prepaid}$ Market Voice Traffic$_{Prepaid}$(Erlangs)=Market Voice IC Traffic$_{Prepaid}$+Market Voice dispatch communication Traffic$_{Prepaid}$ The following calculations are performed to determine the different components of the total interconnect traffic:

Market Voice 6:1 IC Traffic$_{Postpaid}$(Erlangs)=Market Voice IC Traffic$_{Postpaid}$×New 6:1 Penetration Market Voice 3:1 IC Traffic$_{Postpaid}$(Erlangs)=Market Voice IC Traffic$_{Postpaid}$×(1−New 6:1 Penetration)

Market Voice 6:1 IC Traffic$_{Prepaid}$(Erlangs)=Market Voice IC Traffic$_{Prepaid}$×New 6:1 Penetration Market Voice 3:1 IC Traffic$_{Prepaid}$(Erlangs)=Market Voice IC Traffic$_{Prepaid}$×(1−New 6:1 Penetration)

The data traffic calculation uses forecasts of packet data usage, wideband packet data usage, and Busy Hour % Forecast, combined with the average throughput per base radio to calculate the equivalent Erlangs of data usage per Subscriber during the busy hour. Packet data MOUs are calculated by converting monthly data usage per subscriber to equivalent Data MOUs using the following formula:

$$\text{Market Data } MOUs_{Packet\ Data\ or\ Wideband} = Simul\ VC/BR \times$$

$$\frac{\text{Mthly Data Usage}_{Packet\ Data\ or\ Wideband}(kB) \times 8 \times 1024 \text{ bits/kbit}}{60 \text{ sec/min} \times}$$

$$\text{Average Throughput per } BR(kbps) \times 1000 \text{ bps/kbps}$$

The Simultaneous Voice Channels per base radio (Simul VC/BR) are calculated in Calculation (1) (see above) and Average Throughput per base radio can be assumed to be 17 kbps for packet data.

The general formula for the translation of MOUs to Busy Hour traffic is the following:

$$\text{Market Data Traffic (Erlangs)}_{Packet\ Data\ or\ Wideband} =$$

$$\frac{\text{Market Data } MoUs}{60 \text{ min/hour}} \times \frac{\% \text{ Busy Hour}}{\text{Busy Days per Month}}$$

The % Busy Hour is a forecasted value based on past network data. It is calculated by dividing nationwide Bouncing Busy Hour (BBH) voice Erlangs for five consecutive weekdays by the total traffic generated during those five weekdays. The bouncing busy hour accounts for the peak load of each site, i.e., each site's particular busy hour. The nationwide average % Busy Hour can be estimated as 8.9%, which may decrease over time. The decreasing trend may continue but will eventually level off as subscribers' daily usage habits stabilize. Although the % Busy Hour input variable is not unique for each market, and thus it is represented by a single curve that is applied to all markets equally, additional flexibility with this variable can be provided.

Because the % Busy Hour is calculated using weekday traffic only, the first term of the equation above should represent daily traffic for a typical weekday. However, to be conservative, the capacity planning tool of the present invention assumes that all MOUs are generated during weekdays. Thus, weekend traffic is ignored so that the number of Busy Days per Month is equal to the number of weekdays in a month. For a typical month, this is about 21 days. Considering weekend traffic would increase this number to 25 or 26, but the capacity planning tool of the present invention takes a more conservative approach.

Calculation (3)—Per Site Traffic Forecast (Postpaid and Prepaid)

Two current traffic distribution per market (one for postpaid and one for prepaid) are calculated per site by dividing each site's average bouncing busy hour postpaid traffic over one week by the total average bouncing busy hour postpaid traffic in the market during that same week, and by dividing each site's average bouncing hour prepaid dispatch communication MOUs over one month by the total average bouncing busy hour prepaid dispatch communication MOUs in the market during that same month. These provide the percentages of postpaid and prepaid traffic currently carried by each site in the market. These distribution percentages for each site are then multiplied by the total Market postpaid and prepaid Traffic Forecasts calculated in Calculation (2) and then added to get the total Per Site Traffic Forecast for each time period in the analysis. These calculations are performed at the market level for each site in the wireless network and separate values can be computed for each quarter over a ten-year period.

There are two calculations depending on the selection of the GoS approach:

For Fixed GoS:

$$\text{Site Voice \& Data Traffic per sector} =$$

$$\frac{3:1IC \text{ Traffic} + 6:1IC \text{ Traffic} + DC \text{ Traffic} + \text{Data Traffic}}{\text{\# Sectors}}$$

where

3:1 IC Traffic=Market Voice 3:1 IC Traffic$_{Postpaid}$×Traffic Distribution$_{Postpaid}$+Market Voice 3:1 IC Traffic$_{Prepaid}$× Traffic Distribution$_{Prepaid}$ 6:1 IC Traffic=Market Voice 6:1 IC Traffic Postpaid×Traffic Distribution Postpaid+(Market Voice 6:1 IC Traffic Prepaid×Traffic Distribution Prepaid)

Dispatch Communication Traffic=Market Voice dispatch communication Traffic Postpaid×Traffic Distribution Postpaid+(Market Voice dispatch communication Traffic Prepaid×Traffic Distribution Prepaid)

Data Traffic=Market Data Traffic$_{Packet\ Data+Wideband}$
Packet Data×Traffic Distribution$_{Postpaid}$ Note that there is no "weighting" of Erlangs based on the relative amount of resources required to carry each type of traffic, as resource requirements are addressed in Simul VC part in the capacity planning tool of the present invention.

For Variable GoS:

$$\text{Weighted Site Voice Traffic per sector} =$$

$$\frac{2 \times 3:1IC \text{ Traffic} + 6:1IC \text{ Traffic} + DC \text{ Traffic} + 1/2 \times DCCH}{\text{\# Sectors}}$$

$$\text{Weighted Site Voice \& Data Traffic per sector} =$$

$$\frac{2 \times 3:1IC \text{ Traffic} + 6:1IC \text{ Traffic} + DC \text{ Traffic} + 1/2 \times DCCH + \text{Data Traffic}}{\text{\# Sectors}}$$

where $$DCCH \text{ Traffic} = \frac{\text{Control Channel Overhead}}{1 - \text{Control Channel Overhead}} \times$$
$$(3:1IC \text{ Traffic} + 6:1IC \text{ Traffic} + DC \text{ Traffic})$$

Calculation (4)—Max Base Radios per Site

Max base radios per Site are calculated from the number of 800 MHz and 900 MHz channels and the frequency reuse assumptions. The general formula for calculating Max base radios per Site is as follows (note that because radios are discrete elements, the result is rounded to the nearest integer):

$$\text{Max } BRs \text{ Per Site} = \text{round}\left(\frac{\text{\# Channels}}{\text{Site Reuse Factor}}\right)$$

However, several factors serve to further complicate this formula, including the simultaneous use of 800 MHz and 900

MHz channels, the period of partial utilization of 900 MHz spectrum, some historical changes in the model, and the typically uneven distribution of traffic around a site. These modifications are explained in the following sections.

800 and 900 MHz Channel Utilization

The capacity planning tool of the present invention can accommodate different reuse patterns at the different frequencies. Currently, the capacity planning tool of the present invention assumes slightly tighter reuse at 900 MHz than at 800 MHz. Therefore, the general formula above becomes:

$$\text{Max BRs Per Site} = \text{round}\left(\frac{\#800 \text{ MHz Channels}}{800 \text{ MHz Site Reuse Factor}}\right) + \text{round}\left(\frac{\#900 \text{ MHz Channels}}{900 \text{ MHz Site Reuse Factor}}\right)$$

Partial Utilization of 900 MHz Channels

900 MHz radios require further special treatment because the utilization of 900 MHz radios is affected by the number of subscribers who have handsets capable of operating at 900 MHz, whereas the use of 800 MHz radios is only limited by the amount of 800 MHz spectrum that is available. To account for this fact, we determine an effective "utilization rate" based on the percentage of subscribers that have 900 MHz capable handsets and the percentage of total available spectrum that is at 900 MHz. Utilization is defined as the percentage of available capacity that is occupied by available traffic.

$$900 \text{ MHz Utilization Rate } (\%) = \frac{\% \text{ Traffic Offered On 900 MHz Channels}}{\% \text{ Available Capacity Provided By 900 MHz Channels}}$$

The percentage of traffic offered at 900 MHz is assumed to be equal to the 900 MHz handset penetration rate, because 900 MHz-capable handsets will always attempt to use a 900 MHz channel before using an 800 MHz channel. In addition, this inherently assumes that subscribers with 900 MHz-capable handsets have the same average usage per subscriber as subscribers with 800-only handsets. The available capacity provided by 900 MHz channels is determined by the spectrum allocations in each market. Therefore:

$$900 \text{ MHz Utilization Rate } (\%) = \frac{\% \text{ 900 MHz Capable Handsets}}{\frac{\# 900 \text{ MHz Channels}}{\# 800 \text{ MHz Channels} + \# 900 \text{ MHz Channels}}}$$

Now, the number of 900 MHz radios that can be supported is calculated as:

900 MHz Max BRs Per Site =

$$\text{int}\left[900 \text{ MHz Utilization Rate} \times \text{round}\left(\frac{\# 900 \text{ MHz Channels}}{900 \text{ MHz Site Reuse Factor}}\right)\right]$$

Uneven Traffic Around a Site

The present invention can use max base radios per sector values and convert them to max base radios per site. Multiplying the max base radios per sector by 3 sectors per site would give a max base radios per site that assumes that traffic is evenly distributed around a site. This may result in an under-prediction of the number of sites required to serve the traffic in a real world scenario. Therefore, this factor must be derated to account for actual traffic distribution and real world constraints. Accordingly, based on a analysis, it was realized that the average traffic around a site was split roughly 48%/30%/22%. This results in a derating factor equal to:

$$\text{Sector To Site Full Derate} = 1 - \frac{48 + 30 + 22}{48 \times 3} = 1 - \frac{100}{144} = 30.55\%$$

However, applying this derate factor would result in the assumption that sites are split immediately when one sector exceeds the max base radio threshold (in case of fix GoS approach). In some networks this may not hold true because some congestion relief features offload congested sectors by forcing subscribers near the cell boundary to handoff to the adjacent sectors/sites, and wireless networks employ a policy to attempt to frequency plan sectors using an automated frequency planning tool, such as CellOpt, even when they exceed the Max base radio threshold. Additionally, wireless network operators may split a site only when absolutely necessary. Furthermore, in reality two adjacent sectors can be offloaded with one site rather than two. The above derate factor would produce one new site for each sector that exceeds the Max base radio threshold. Therefore, applying the derate factor above would have the effect of over-predicting the number of sites necessary to serve the traffic, and some reduction of the full derate factor is appropriate. Accordingly, it has been realized that a derate reduction of 50% is desirable, thus a total derate of 15% can be employed.

As an example, if a market has a Max base radios stack per sector of 10 base radios and 3 sectors per site, then Max base radios per site is computed by:

Max BRs Per Site=Max BRs Per Sector×Sectors Per Site×(1−Derate Factor)=10×3×(1−15%)=25.5

This value is then truncated to an integer value, thus in the example above the Max base radios per site threshold is 25 base radios. If more than 25 base radios are needed at this site to serve the offered traffic, the capacity planning tool of the present invention assumes that a new capacity site is built to handle the traffic.

Historical Modifications

As discussed above, the capacity planning tool of the present invention can utilize Max base radios per sector values which are converted into Max base radios per Site values within the tool in the manner described above. However, the capacity planning tool of the present invention can incorporate a calculation to determine Max base radios per Sector from the number of 800 MHz and 900 MHz channels available in each market during each time period of the analysis. This simplified the inputs, but created an inconsistency in the data that is described below.

The calculation used to determine Max base radios per Sector can be:

$$\text{Max BRs Per Sector} = \text{round}\left(\frac{\# \text{ Channels}}{\text{Site Reuse Factor}} \times \frac{1}{\text{Sectors Per Site}}\right)$$

Because the ultimate goal is to determine the Max base radios Per Site, it is desirable to skip the calculation of Max base radios per Sector entirely. However, the following inequality results due to the placement of the rounding function:

$$\text{round}\left(\frac{\text{\# Channels}}{\text{Site Reuse Factor}}\right) \neq$$
$$\text{round}\left[\text{round}\left(\frac{\text{\# Channels}}{\text{Site Reuse Factor}} \times \frac{1}{\text{Sectors Per Site}}\right) \times \text{Sectors Per Site}\right]$$

In the equation above, the expression on the left is the simplified calculation of Max base radios per Site described above. The expression on the right contains the rounded value for Max base radios per Sector, multiplied by the number of sectors per site to give a per-site value (prior to applying the derate factor described above). Because the rounding to an integer may not have been performed at the sector level, the expression on the left may or may not produce the same result on a per site basis as the expression on the right. Considering that each analysis considers a large number of sites, substituting the expression on the left can produce different results than the expression on the right.

Considering all of the factors discussed above, the resulting equation to calculate the Max base radios Per Site is:

$$\text{Max BR per Site} = \text{int}\left\{(1 - \text{DerateFactor}) \times \left[\begin{array}{l}\text{ROUND}\left(\frac{\text{\#800 MHz Channels}}{\text{800 MHz Site Reuse Factor}}\right) + \\ \text{900 MHz Util Rate} \times \text{ROUND}\left(\frac{\text{\#900 MHz Channels}}{\text{900 MHz Site Reuse Factor}}\right)\end{array}\right]\right\}$$

Calculation (5)—Required Voice Channels per Site

This calculation is only used when Fixed GoS is selected. With the traffic forecasted for each site currently in the network, it is possible to calculate the number of trunks required at each site using the Erlangs B traffic model with an assumed grade of service. The grade of service is a matrix input that can vary over time and by market.

This calculation is done at the sector level so that trunking efficiencies are properly handled. Therefore, the traffic carried by a sector is used to compute the number of voice channels required per sector using the Erlangs B function. The result is a rounded number of voice trunks required to carry the offered traffic for a given GoS assumption at each sector.

Voice Channels Required Per Sector=channel_Erlang_Table_B(GoS, Site Voice & Data Traffic per sector)

Multiple Channel Packet Data Voice Channels Required Per Sector=channel_Erlang_Table_B (GoS,Multiple Channel Packet Data Traffic per sector)

Note that in lieu of detailed sector-level traffic information, each two and three sector site is divided into evenly distributed sectors. The uneven distribution of traffic around a sector is taken into account later in the model, in Calculation (7).

Calculation (6)—Base Radios per Site

This calculation is only used when Fixed GoS is selected. Because we have calculated the number of Voice Channels required at each sector/site, as well as, the number of simultaneous Voice Channels per base radio based on the New 6:1 mix, it is possible to calculate the number of base radios required at each site. This is simply:

BRs Required Per Site =
$$\max\left(\text{roundup}\left(\frac{\text{Voice Channels Required Per Sector}}{\text{Simul Voice Channels Per BR}} \times \text{\# Sectors}\right), \text{\# Sectors}\right)$$

Because the number of base radios per site must be an integer and at least one base radio per sector, the result of the formula is the maximum between the nearest integer (up or down) and the number of sectors. Note that the rounding takes place at site level, rather than rounding at sector level and then multiplying the integer result by the number of sectors. Based on an analysis of various rounding options (including applying rounding up, rounding, or truncating at either sector or site level), the method shown above produces the most accurate output.

Wideband packet data base radios are also calculated in this part of the capacity planning tool of the present invention.

Wideband Packet Data BRs Required Per Site =
$$\text{roundup}\left(\frac{\text{Wideband Packet Data Voice Channels Required Per Sector}}{\text{Simul Voice Channels Per BR}} \times \text{\# Sectors}\right)$$

Calculation (7)—Number of Sites Required

This calculation is only used when Fixed GoS is selected. The end result of Calculation (6) is the number of base radios that will be required at each of the current sites in a wireless network given the assumptions and inputs entered into the capacity planning tool of the present invention. Calculation (4) accounts for spectrum and interference limitations specific to each market to determine the maximum number of base radios that can be deployed at any one site in a market so that a workable frequency plan can be developed for the network. Based on the results of Calculation (4) and Calculation (6), the number of times a site must split can be easily calculated by dividing the Number of base radios Required by the Max base radios and rounding the result up to the nearest integer. Thus, the capacity planning tool of the present invention calculates the number of incremental sites that are required to meet capacity requirements by leveraging knowledge that the original site coverage area will be covered by the original site and all of its capacity offspring. By performing calculations at the site level, the present invention maintains site geography, and therefore, more accurately predicts the number of splits required—compared to calculations performed at the sector level which may over-predict the number of sites required.

Given the impact of wideband packet data, the capacity planning tool of the present invention considers that a site may split not only for voice demand but also for wideband packet data capacity. Each site may not be able to handle more of twelve base radios for wideband packet data. Accordingly, if more base radios are needed, a site must be split. The final Number of Sites Required is the maximum between the number of Voice and wideband packet data sites required.

$$\text{Number of Sites Required} = \max\left(\text{roundup}\left(\frac{\text{BRs Required per Site}}{\text{Max BR per Site}}\right),\right.$$
$$\left.\text{roundup}\left(\frac{\text{Wideband Packet Data BRs Required per Site}}{12}\right)\right)$$

Calculation (8)—Number of Sites Required

This calculation is only used when Variable GoS is selected. The Maximum base radio per site calculated in (4) is used to obtain the maximum traffic, in Erlangs, that a sector of a site with this maximum number of base radio can handle. Using this maximum capacity, the number of sites required is calculated by dividing the weighted traffic calculated in (3) by this value.

Sites Required =

$$\text{roundup}\left(\frac{\text{Weighted Traffic per sector}}{\text{Maximum Traffic associated to Max BRs per sector}}\right)$$

The reported number of sites required may differ from above calculation to take into consideration the limitation of wideband packet data base radios per site. The final number reported as site required output is calculated as:

$$\text{Final reported Number of Sites Required} = \max\left(\text{\# Sites Required},\right.$$
$$\left.\text{roundup}\left(\frac{\text{Wideband Packet Data BRs Required per Site}}{12}\right)\right)$$

Calculation (9)—Base Radios per Site

This calculation is only used when Variable GoS is selected. The weighted traffic calculated in (3) is used with the Variable GoS Criteria table to obtain the number of base radio required. The capacity planning tool of the present invention takes into consideration the number of sites needed.

BRs Pre Site =

$$\left[\begin{array}{l}(\text{\# Sites Required} - 1) \times \text{int}\left(\frac{\text{Max BR per Site}}{\text{\# Sectors}}\right) + \\ \text{lookup in } VGoS \text{ Criteria}\left(\begin{array}{l}\text{Weighted Traffic per sector} - \\ (\text{\# Sites Required} - 1) \times \\ \text{Max Traffic associated to} \\ \text{Max BRs per sector}\end{array}\right)\end{array}\right] \times \text{\# Sectors}$$

Calculation (10)—T1 module—Base Radios Ratio

Base radio Ratio is the relation between the number of base radios assigned to a split site and the total number of base radios needed for all the splits of an original site, calculated in (6) or (9)

$$\text{BRs Ratio} = \frac{\text{BRs assigned to a split}}{\text{BR Required}}$$

In order to distribute the base radios among the required sites, a backhaul calculation module ("T1 module") can use two different approaches:

The first approach, referred to as the zero off-load approach, distributes the required base radios evenly among the number of BTS required. For example, if a site split in 3 and needs 60 base radios, then 20 base radios will be assigned to each split site, resulting in a base radios Ratio of 1/3.

The second approach, referred to as the percentage distribution table approach, distributes the required base radios depending in the number of splits, see table bellow. If a site split into 3, the first split will have 50% of the base radios (base radios Ratio=0.5), the second will have 30% (base radios Ratio=0.3) and the last will have 20% (base radios Ratio=0.2). This table is an input for T1 module and it can be updated as needed.

| # of Split Sites | Split Sites base radios & Traffic Distribution | | | | | | | | |
|---|---|---|---|---|---|---|---|---|---|
| | 1 | 2 | 3 | 4 | 5 | 6 | 7 | 8 | 9 |
| 2 | 70% | 30% | | | | | | | |
| 3 | 50% | 30% | 20% | | | | | | |
| 4 | 40% | 25% | 20% | 15% | | | | | |
| 5 | 30% | 20% | 20% | 15% | 15% | | | | |
| 6 | 25% | 15% | 15% | 15% | 15% | 15% | | | |
| 7 | 20% | 15% | 15% | 15% | 15% | 10% | 10% | | |
| 8 | 20% | 15% | 15% | 10% | 10% | 10% | 10% | 10% | |
| 9 | 20% | 15% | 15% | 10% | 10% | 10% | 10% | 5% | 5% |

If for a particular case the number of splits is larger than 9, T1 module will distribute the base radios evenly.

Calculation (11)—DS0 Required

The number of voice channels per backhaul link (i.e., the number of DS0s) required for a particular site/split depends on how the traffic is handled. Currently, interconnect and dispatch traffic are handled differently. Dispatch traffic and Packet Data can be routed through a frame relay network while interconnect calls are circuit switched (DS0 is assigned for all call duration).

Given this differentiation, DS0 is calculated as:

$$\#DS0 \text{ Required} = 2 + \text{roundup}\left(\frac{\text{chan\_b}(GoS_{T1}, IC \text{ Traffic} \times \text{BRs Ratio})}{4}\right) +$$
$$\text{roundup}\left(\frac{\text{chan\_b}(GoS_{T1}, DC \text{ Traffic} \times \text{BRs Ratio})}{10}\right) + \text{Data } DS0$$

where 2 DS0 are reserved for a modified A-bis interface (mobis) and simple network management protocol (snmp), $GoS_{T1}$ is 0.001, IC traffic is circuit switched, and dispatch communication Traffic and Data DS0 are packetized.

If interconnect and dispatch calls are handled through a frame relay network, the number of required DS0s is reduced. Under this condition the "# DS0s Required" can be calculated as:

$$\#DS0 \text{ Required} = 2 + \text{roundup}\left(\frac{\text{chan\_b}(GoS_{T1}, \text{ Weighted Traffic} \times \text{BRs Ratio})}{10}\right) + \text{Data } DS0$$

Data DS0 depend on the activity of wideband packet data and single channel packet data. In order to be conservative, the tool take the maximum DS0 that satisfy data demand:

Data DS0=Max(# PCH DS0,# Wideband Packet Data DS0)

The number of DS0 for Packed data is calculated as $$\#PCHDS0 = \max\left\{\text{roundup}\left(\frac{\text{chan\_b}\left(GoS_{T1}, \frac{\text{Data Traffic}}{\# \text{ Sectors}} \times \text{BRs Ratio}\right)}{\text{Simul } VC}\right) \times \# \text{ Sectors} \times 6, \frac{\# \text{ Sectors}}{3}\right\}$$

For wideband packet data:

# of Wideband Packet Data DS0=max(0.93×WidebandPacketData BRs Required per Site×BRs Ratio,3.72 if <3 sectors,4.92 if ≥3 sectors)

Calculation (12)—T1 Required

The number of T1 is calculated dividing the number of needed DS0 by 24 (Each T1 handles 24 DS0).

$$\#T1 \text{ Required} = \text{roundup}\left(\frac{\#DS0 \text{ Required}}{24}\right).$$

The capacity planning tool of the present invention can be implemented by a microprocessor executing program code, a field programmable gate array (FPGA), application specific integrated circuit (ASIC), and/or the like.

The present invention has been described in connection with exemplary embodiments in which specific network parameters are provided. However, the present invention can be employed in networks with different network parameters. For example, although the present invention has been described in connection with particular types of vocoders (e.g., 3:1, 6:1 and 12:1), the present invention is equally applicable to other types of vocoders. Similarly, although the present invention has been described in connection with particular frequency bands (e.g., 800 and 900 MHz), the present invention is equally applicable to other frequency bands.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for wireless network planning, the method comprising the acts of:
    determining, for a base radio, a number of voice channels for supporting at least two different wireless communication services by the base radio;
    determining an amount of network traffic per base station site by separately determining an amount of traffic for prepaid mobile stations for a first one of the at least two different wireless communication services and a second one of the at least two different wireless communication services, and
    postpaid mobile stations for the first one of the at least two different wireless communication services and the second one of the at least two different wireless communication services; and
    determining a number of base radios per base station site to support the determined amount of network traffic,
    wherein the determination of the number of base radios per base site accounts for a fixed amount of control channel overhead regardless of the number of base radios per base station site.

2. The method of claim 1, wherein the at least two different wireless communication services are selected from the group comprising dispatch voice, interconnect voice or packet data services.

3. The method of claim 1, further comprising the act of:
    determining a number base station sites for the wireless network.

4. The method of claim 3, wherein the number of base station sites are determined based on a fixed grade of service.

5. The method of claim 3, wherein the number of base station sites are determined based on a variable grade of service.

6. The method of claim 3, further comprising the act of:
    determining a number of backhaul voice channels for each of the base station sites.

7. The method of claim 6, further comprising the act of:
    determining a number of backhaul communication links for each of the base station sites.

8. The method of claim 3, further comprising the act of:
    determining a number of base station sites to split into two or more base station sites.

9. The method of claim 1, wherein the determination of the number of voice channel per base radio accounts for an ability of the different wireless communication services to operate in at least two different frequency bands.

10. The method of claim 1, wherein the determination of the number of voice channels accounts for different types of voice coders for at least one of the different wireless communication services.

11. The method of claim 1, wherein the determination of the number of voice channels accounts for network capacity required for control channels.

12. The method of claim 1, wherein the amount of network traffic per base station site accounts for uneven traffic distribution in different sectors of the base station site.

13. The method of claim 1, wherein the prepaid mobile stations have a different amount of traffic for each of the at least two wireless communication services than postpaid mobile stations.

14. A method for wireless network planning, the method comprising the acts of:
    determining, for a base radio, a number of voice channels for supporting at least two different wireless communication services by the base radio, wherein the at least two different wireless communication services are selected from the group comprising voice dispatch, voice interconnect and packet data services, wherein the determination of the number of voice channels accounts for an ability of the at least two different wireless communication services to operate in at least two different frequency bands, and wherein one of the at least two different wireless communication services does not operate in one of the at least two different frequency bands;

determining an amount of network traffic per base station site by separately determining an amount of traffic for
- prepaid mobile stations for a first one of the at least two different wireless communication services and a second one of the at least two different wireless communication services, and
- postpaid mobile stations for the first one of the at least two different wireless communication services and the second one of the at least two different wireless communication services; and determining a number of base radios per base station site to support the determined amount of network traffic, wherein the determination of the number of base radios per base site accounts for a fixed amount of control channel overhead regardless of the number of base radios per base station site.

15. The method of claim 14, further comprising the act of: determining a number of base station sites for the wireless network.

* * * * *